Jan. 10, 1956  G. F. HAUSMANN  2,729,937
RETRACTABLE FLAMEHOLDERS FOR AFTERBURNERS
Filed March 20, 1951
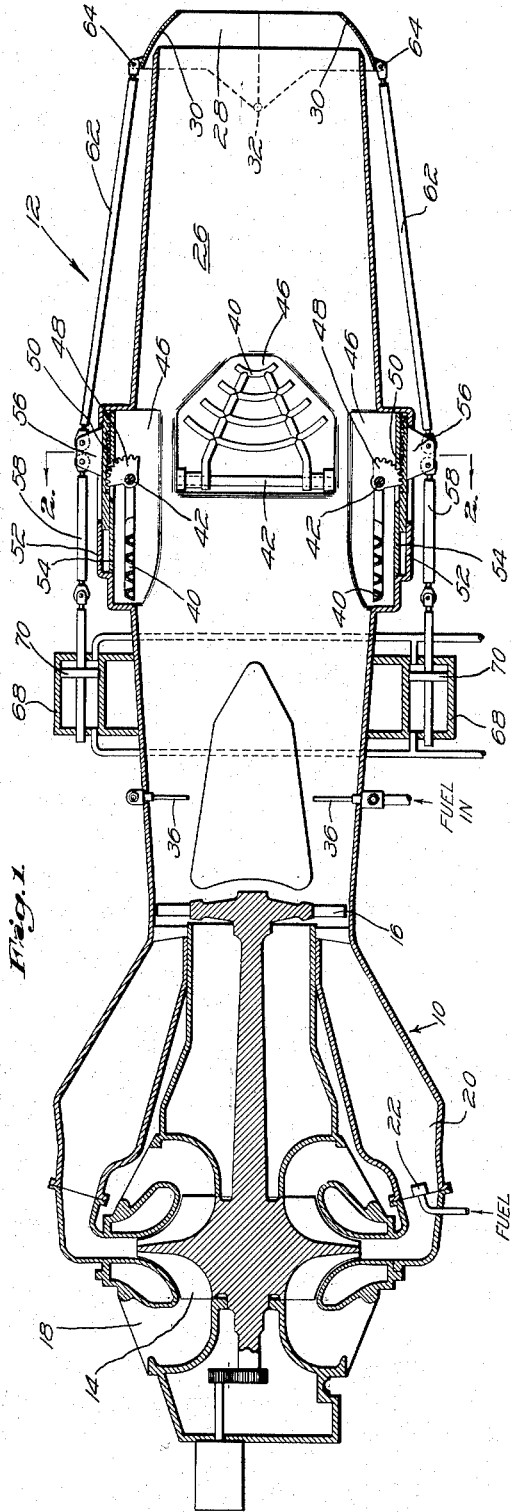
Inventor
George F. Hausmann
By Leonard F. Wekind
Agent United States Patent Office 2,729,937
Patented Jan. 10, 1956

2,729,937

RETRACTABLE FLAMEHOLDERS FOR AFTERBURNERS

George F. Hausmann, Windsor, Conn., assignor to United Aircraft Corporation, East Hartford, Conn., a corporation of Delaware Application March 20, 1951, Serial No. 216,559

1 Claim. (Cl. 60—35.6)

This invention relates to turbojet engines and more specifically to improved mechanisms for afterburners for such power plants.

The advent of high powered turbojet power plants and the development of afterburner or reheat mechanisms therefor has necessitated the use of flameholders to insure adequate flame propagation in the afterburner for maximum thrust generation. However, under normal high power output of the basic power plant and high gas velocities therein, the flameholders produce considerable drag when the afterburner is not in operation. The resulting pressure drop across the flameholder reduces the thrust output of the basic power plant.

It is therefore an object of this invention to provide a retractable flameholder mechanism for an afterburner to improve the operation of the basic power plant when afterburning is not taking place.

A further object of this invention is to provide a movable form flameholder mechanism to prevent exposure of the flameholder to the direct flow of exhaust gases during non-operation of the afterburner.

A further and primary object of this invention is to provide a mechanism for moving the flameholder mechanism from an inoperative to an operative position while simultaneously varying the area of the exhaust nozzle of a power plant.

These and other objects will become readily apparent from the following detail description of the drawing in which:

Fig. 1 is a plan sectional view of a turbojet power plant including an afterburner comprising the features of this invention.

Fig. 2 is a cross-sectional view taken along the line 2—2 of Fig. 1.

Fig. 3 is a partial plan sectional view of a modified form of flameholder mechanism for an afterburner; and Fig. 4 is a cross-sectional view taken along the line 4—4 of Fig. 3.

Referring to Fig. 1, a basic turbojet power plant is illustrated at 10 having an extended exhaust conduit forming an afterburner generally indicated at 12. The basic power plant 10 comprises a centrifugal compressor 14 which is driven by a turbine 16. The compressor 14 receives air from the inlet 18 and forces compressed air into a combustion chamber 20 where it is mixed with fuel which is injected by means of a nozzle 22. The mixture of air and fuel is ignited by any suitable means (not shown) whereby the mixture burns to generate hot gases which in turn drive the turbine 16.

During normal operation the exhaust gases from the turbine 16 are ejected through the elongated exhaust duct 26 and then through the variable exhaust nozzle opening 28. The exhaust nozzle opening 28 is formed by a plurality of elements 30 which are movable about a pivot 32 so as to vary the area of the opening 28. When increased power and thrust is desired, added fuel may be injected through additional fuel nozzles 36 located downstream of the turbine 16. In order to insure adequate flame propagation and efficient combustion a flameholder is provided downstream of the fuel nozzles 36. The flameholder may be in the shape of a grid or other similar structural array whereby low pressure areas are created on the downstream side thereof so as to provide efficient burning by means of adequate flame propagation. During operation of the afterburner it is further desirable to increase the area of the opening 28 of the exhaust nozzle so as to obtain maximum effect and thrust from the high velocity exhaust gases.

To this end the flameholder comprises a plurality of segments 40 which are supported on pivots 42 adjacent the wall of the duct 26. Each of these segments are movable between a position in which they lie substantially parallel to the axis of flow and a position in which they lie in a substantially common plane transversely of the axis of flow. When the segments 40 are in a transverse plane they cooperate to form a grid which extends completely across the duct as shown in Fig. 2.

In order that the flameholder segments 40 have a minimum effect on the flow through the duct 26 when they are in their inoperative position during non-afterburning, a plurality of recesses 46 are provided in the wall of the duct 26 whereby the flameholder segments 40 may be moved to a position substantially flush with the wall of the duct 26.

Each of the flameholder segments 40 has fixed thereto a gear segment 48 which cooperates with a rack 50 slidable axially of the duct 26 and positioned between a pair of guide members 52 and 54. The rack 50 in turn is fixed to a carriage 56 which is moved by a rod 58 operatively connected thereto. The carriage 56 is also connected to the outer extremities of the movable elements 30 of the exhaust nozzle by means of a rod 62. The rod 62 is connected to the elements 30 as at points 64 which are spaced from the pivot 32 to impart an operating force to the exhaust nozzle elements 30.

Each of the rods 58 are operatively connected to a fluid motor 68 which is supplied fluid under pressure to move a piston 70 in either of two directions.

As seen in Fig. 2, each of the racks 50 directly move two of the four segments 40 of the flameholder. Thus it can be seen that as the right-hand rack 50 in Fig. 2 rotates the adjacent flameholder segment, a bevel gear 71 on the shaft of that flameholder segment will rotate a bevel pinion 72 which in turn will rotate a bevel gear 74 fixed to the shaft of the adjacent flameholder segment.

With the structure just described, it is apparent that each adjacent flameholder segment will rotate in opposite directions from its operative to its inoperative position. This is clearly illustrated in Fig. 1.

In order to have each of the flameholder segments movable in the same direction a slightly different arrangement for moving the segments is shown in Figures 3 and 4. As illustrated herein, a drive shaft 158 which is axially movable by means of a fluid motor 168 reciprocates a carriage 156 which has a pair of beveled tooth racks thereon which engage bevel gears 160 and 162 carried by each of two segments of the flameholder. Thus as the carriage 156 is moved axially it will move a pair of the segments 40 in the same direction. Likewise the carriage 170 will rotate adjacent bevel gear pinions 172, 174 and the other two flameholder segments.

Inasmuch as the flameholder segments are operatively connected to the movable elements 30 of the exhaust nozzle the flameholder will be moved from a retracted to an extended operative position simultaneously with the opening of the exhaust nozzle. As a result, during normal engine operation a duct 26 is substantially free of any blockage while during afterburning the flameholders are placed in inoperative position while the area of the exhaust nozzle is simultaneously varied to obtain maximum effect of the exhaust gases.

Although certain embodiments of this invention have been illustrated and described herein, it will be apparent that various changes may be made in the arrangement and construction of the various elements without departing from the scope of this novel concept.

What it is desired to obtain by Letters Patent is:

In an afterburner for a turbojet power plant comprising an elongated duct having exhaust gases passing therethrough, means for injecting fuel into the duct, a flameholder for improving flame propagation in the duct comprising a segmental grid, each of the segments being pivotally supported in the outer duct wall and forming a quarter of a substantially flat circular grid, said segments being movable into a plane transversely of and into said gas stream whereby they are in an operative position, said segments also being movable to planes parallel to and out of the gas stream, a plurality of recesses in the outer wall of the duct for receiving the segments when in planes parallel to said gas stream, mechanism operatively connected to said segments for simultaneously pivoting them into either of said transverse and parallel planes comprising toothed elements engaging said segments adjacent their pivots, a motor for moving said toothed elements, movable elements for varying the exhaust end area of said duct, and means operatively connecting said movable elements with said motor for simultaneously varying said area and pivoting said segments.

References Cited in the file of this patent

UNITED STATES PATENTS

| | | |
|---|---|---|
| 2,508,420 | Redding | May 23, 1950 |
| 2,529,506 | Lloyd et al. | Nov. 14, 1950 |
| 2,569,497 | Schiesel | Oct. 2, 1951 |
| 2,572,723 | Hildestad | Oct. 23, 1951 |
| 2,632,994 | Sargent | Mar. 31, 1953 |
| 2,707,372 | Cleveland | May 3, 1955 |

FOREIGN PATENTS

| | | |
|---|---|---|
| 648,497 | Great Britain | Jan. 3, 1951 |
| 922,032 | France | Jan. 20, 1947 |